United States Patent
Oono et al.

(10) Patent No.: US 9,315,114 B2
(45) Date of Patent: Apr. 19, 2016

(54) DEVICE FOR CONTROLLING ELECTRIC VEHICLE AND METHOD OF CONTROLLING ELECTRIC VEHICLE

(71) Applicant: NISSAN MOTOR CO., LTD., Yokohama-shi, Kanagawa (JP)

(72) Inventors: Shou Oono, Isehara (JP); Ken Itou, Machida (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/394,957

(22) PCT Filed: Mar. 7, 2013

(86) PCT No.: PCT/JP2013/056295
§ 371 (c)(1),
(2) Date: Oct. 16, 2014

(87) PCT Pub. No.: WO2013/157315
PCT Pub. Date: Oct. 24, 2013

(65) Prior Publication Data
US 2015/0112532 A1     Apr. 23, 2015

(30) Foreign Application Priority Data
Apr. 18, 2012   (JP) .................................. 2012-094722

(51) Int. Cl.
*B60L 15/06*   (2006.01)
*B60L 7/14*    (2006.01)
*B60L 11/18*   (2006.01)
(Continued)

(52) U.S. Cl.
CPC . *B60L 15/06* (2013.01); *B60L 7/14* (2013.01); *B60L 11/1803* (2013.01); *B60L 15/20* (2013.01); *B60L 15/2009* (2013.01); *H02P 6/08* (2013.01); *B60L 2240/12* (2013.01); *B60L 2240/421* (2013.01); *B60L 2240/423* (2013.01); *B60L 2240/429* (2013.01); *B60L 2270/145* (2013.01); *Y02T 10/642* (2013.01); *Y02T 10/7005* (2013.01); *Y02T 10/7275* (2013.01)

(58) Field of Classification Search
None
See application file for complete search history.

(56) References Cited

U.S. PATENT DOCUMENTS 5,495,158 A *  2/1996  Schmidt et al. ............... 318/561
6,756,758 B2 *  6/2004  Karikomi et al. ............. 318/434

(Continued)

FOREIGN PATENT DOCUMENTS

JP   2002-152916 A    5/2002
JP    2003-9566 A     1/2003
(Continued)

*Primary Examiner* — Fadey Jabr
*Assistant Examiner* — Krishnan Ramesh
(74) *Attorney, Agent, or Firm* — Foley & Lardner LLP

(57) ABSTRACT

A device for controlling an electric vehicle includes: a feedforward computation unit that is configured to input a motor torque instruction value and compute a first torque target value by feedforward computation; and a motor torque control unit that is configured to control a motor torque according to the first torque target value. The feedforward computation unit includes: a vehicle model which is configured to input the motor torque instruction value to model a characteristic from the motor torque to a drive shaft torsional angular velocity; and a drive shaft torsional angular velocity feedback model which is configured to feed back the drive shaft torsional angular velocity output from the vehicle model to the motor torque instruction value to compute the first torque target value.

9 Claims, 11 Drawing Sheets

(51) Int. Cl.
   *B60L 15/20*   (2006.01)
   *H02P 6/08*   (2006.01)

(56) References Cited

U.S. PATENT DOCUMENTS

| | | | |
|---|---|---|---|
| 7,164,247 B2* | 1/2007 | Joe et al. | 318/432 |
| 9,150,117 B2* | 10/2015 | Itou | |
| 2002/0190683 A1* | 12/2002 | Karikomi et al. | 318/632 |
| 2006/0017414 A1* | 1/2006 | Joe et al. | 318/432 |
| 2013/0184918 A1* | 7/2013 | Motosugi et al. | 701/22 |
| 2014/0121871 A1* | 5/2014 | Kim | 701/22 |
| 2015/0127202 A1* | 5/2015 | Itou | 701/22 |

FOREIGN PATENT DOCUMENTS

| | | |
|---|---|---|
| JP | 2005-269835 A | 9/2005 |
| JP | 2006-50750 A | 2/2006 |
| JP | 2010-200567 A | 9/2010 |

* cited by examiner

DEVICE FOR CONTROLLING ELECTRIC VEHICLE AND METHOD OF CONTROLLING ELECTRIC VEHICLE

TECHNICAL FIELD

The present invention relates to a device for controlling an electric vehicle that can be driven by an electric motor and a method of controlling an electric vehicle.

BACKGROUND ART

Conventionally, a technology is known in which a deviation between a corresponding rotation speed where the rotation speed of a motor is made to correspond to the rotation speed of a drive wheel and the average rotation speed of the drive wheel is multiplied by a predetermined gain to compute a correction value, the correction value is subtracted from a torque instruction value of the motor and thus vibrations caused by variations in the torque of a vehicle are reduced (see JP2002-152916A).

SUMMARY OF INVENTION

Here, in JP2002-152916A, the predetermined gain is determined such that a motion equation of the drive system of an electric automobile where the rotation speed of the motor, the rotation speed of the drive wheel and the torsional angle of a drive shaft are described as variables and the extremes of a characteristic equation in a state-motion equation of a control system using an input torque of the motor obtained by subtracting the correction value from the torque instruction value are real numbers. Hence, when a lag time, such as a lag in the computation of a CPU, a lag in the detection of the rotation speed or a lad in the torque response of the motor, that is present in a feedback control system is great, the control system is diverged. When a feedback gain is lowered in order to prevent the divergence of the feedback control system described above, the extreme of the characteristic equation described above is prevented from being a real number, with the result that a vibration suppression function is disadvantageously insufficient.

An object of the present invention is to achieve both the acquisition of the stability of a control system and a vibration suppression function.

A device for controlling an electric vehicle according to an embodiment includes: a feedforward computation unit that is configured to input a motor torque instruction value and compute a first torque target value by feedforward computation; and a motor torque control unit that is configured to control a motor torque according to the first torque target value. The feedforward computation unit includes: a vehicle model which is configured to input the motor torque instruction value to model a characteristic from the motor torque to a drive shaft torsional angular velocity; and a drive shaft torsional angular velocity feedback model which is configured to feed back the drive shaft torsional angular velocity output from the vehicle model to the motor torque instruction value to compute the first torque target value.

Embodiments of the present invention and advantages of the present invention will be described in detail below with reference to accompanying drawings.

DESCRIPTION OF EMBODIMENTS

—First Embodiment—

Figure 1:
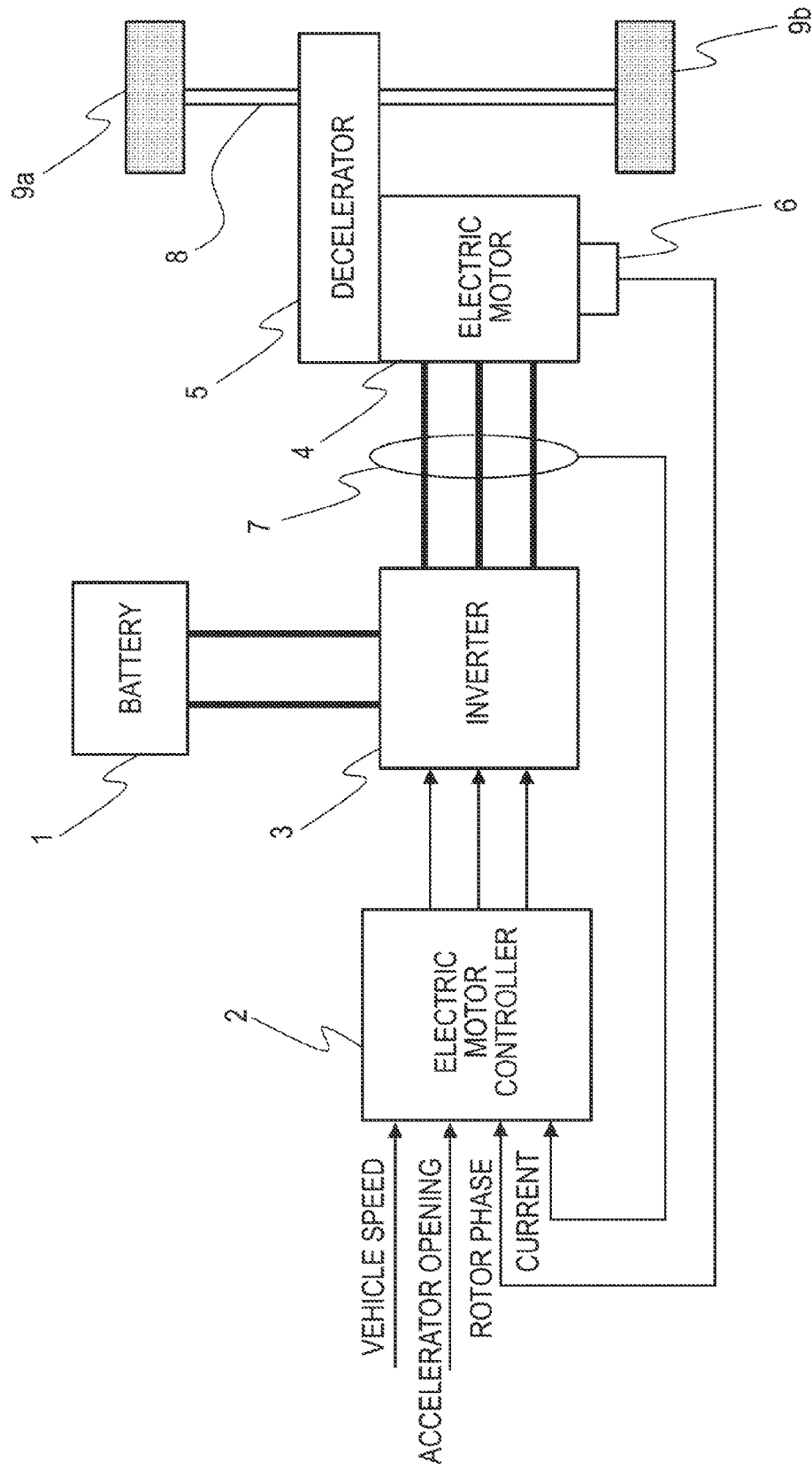
FIG. 1 is a block diagram showing a main configuration of an electric automobile including a device for controlling an electric vehicle according to a first embodiment.

FIG. 1 is a block diagram showing a main configuration of an electric automobile including a device for controlling an electric vehicle according to a first embodiment. The electric vehicle refers to an automobile that has an electric motor as a part or the whole of the drive source of a vehicle and that can travel by the drive force of the electric motor, and the electric vehicle includes not only an electric automobile but also a hybrid automobile and a fuel-cell automobile.

An electric motor controller 2 inputs, as digital signals, signals indicating the state of the vehicle such as a vehicle speed V, an accelerator opening θ, the rotor phase α of an electric motor 4 and the currents iu, iv and iw of the electric motor 4, and generates, based on the input signals, a PWM signal for controlling the electric motor 4. The electric motor controller 2 also generates a drive signal for an inverter 3 according to the generated PWM signal.

The inverter 3 includes, for example, two switching elements (for example, a power semiconductor element such as an IGBT or a MOS-FET) for each phase, turns on and off the switching elements according to the drive signal to convert a direct current supplied from a battery 1 into an alternating current and passes a desired current through the electric motor 4.

The electric motor (three-phase alternating-current motor) 4 generates a drive force with the alternating current supplied from the inverter 3, and transmits the drive force to drive wheels 9a and 9b through a decelerator 5 and a drive shaft 8. When the electric motor 4 is rotated by the drive wheels 9a and 9b at the time of travel of the vehicle, a regenerative drive force is generated, and thus the kinetic energy of the vehicle is collected as electrical energy. In this case, the inverter 3 converts an alternating current generated by the electric motor 4 at the time of a regenerative operation into a direct current, and supplies it to the battery 1.

A current sensor 7 detects the three-phase alternating currents iu, iv and iw flowing through the electric motor 4. However, since the sum of the three-phase alternating currents iu, iv and iw is zero, currents of arbitrary two phases are detected, and thus the current of the remaining phase may be determined by computation.

A rotation sensor 6 is, for example, a resolver or an encoder, and detects the rotor phase α of the electric motor 4.

Figure 2:
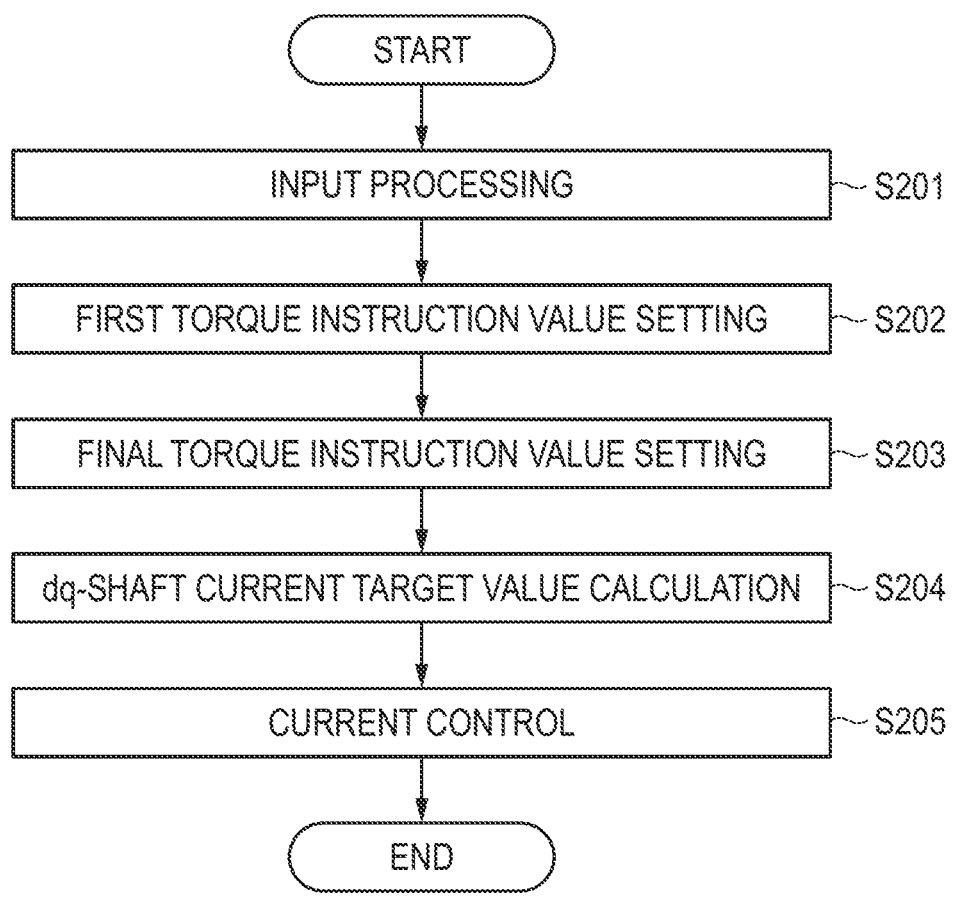
FIG. 2 is a flowchart showing the flow of processing performed by an electric motor controller 2.

FIG. 2 is a flowchart showing the flow of processing performed by the electric motor controller 2.

In step S201, the signals indicating the state of the vehicle are input. Here, the vehicle speed V (km/h), the accelerator opening θ (%), the rotor phase α (rad) of the electric motor 4, the rotation rate Nm (rpm) of the electric motor 4, the angular velocity ω (rad/s) of the rotor, the currents iu, iv and iw of the electric motor 4 and a direct-current voltage value Vdc (V) between the battery 1 and the inverter 3 are input.

The vehicle speed V (km/h) is acquired by communication from an unillustrated vehicle speed sensor or another controller such as an unillustrated brake controller. The rotation speed ωm is multiplied by a tire dynamic radius R, and is divided by the gear ratio of a final gear, and thus the vehicle speed v (m/s) is determined; the unit is converted by multiplying the vehicle speed v (m/s) by 3600/1000, and thus the vehicle speed V (km/h) is determined.

The accelerator opening θ (%) is acquired from an unillustrated accelerator opening sensor or is acquired by communication from another controller such as an unillustrated vehicle controller.

The rotor phase α (rad) of the electric motor 4 is acquired from the rotation sensor 6. The rotation rate Nm (rpm) of the electric motor 4 is determined as follows: the angular velocity ω (electric angle) of the rotor is divided by the number of pole pairs in the electric motor 4, and thus the motor rotation speed ωm (rad/s) that is the mechanical angular velocity of the electric motor 4 is determined, and the determined motor rotation speed ωm is multiplied by 60/(2π). The angular velocity ω (rad/s) of the rotor is determined by differentiating the rotor phase α.

The currents iu, iv and iw (A) of the electric motor 4 are acquired from the current sensor 7.

The direct-current voltage value Vdc (V) is determined from a voltage sensor (not shown) provided in a direct-current power supply line between the battery 1 and the inverter 3 or a power supply voltage value transmitted from an unillustrated battery controller.

Figure 3:
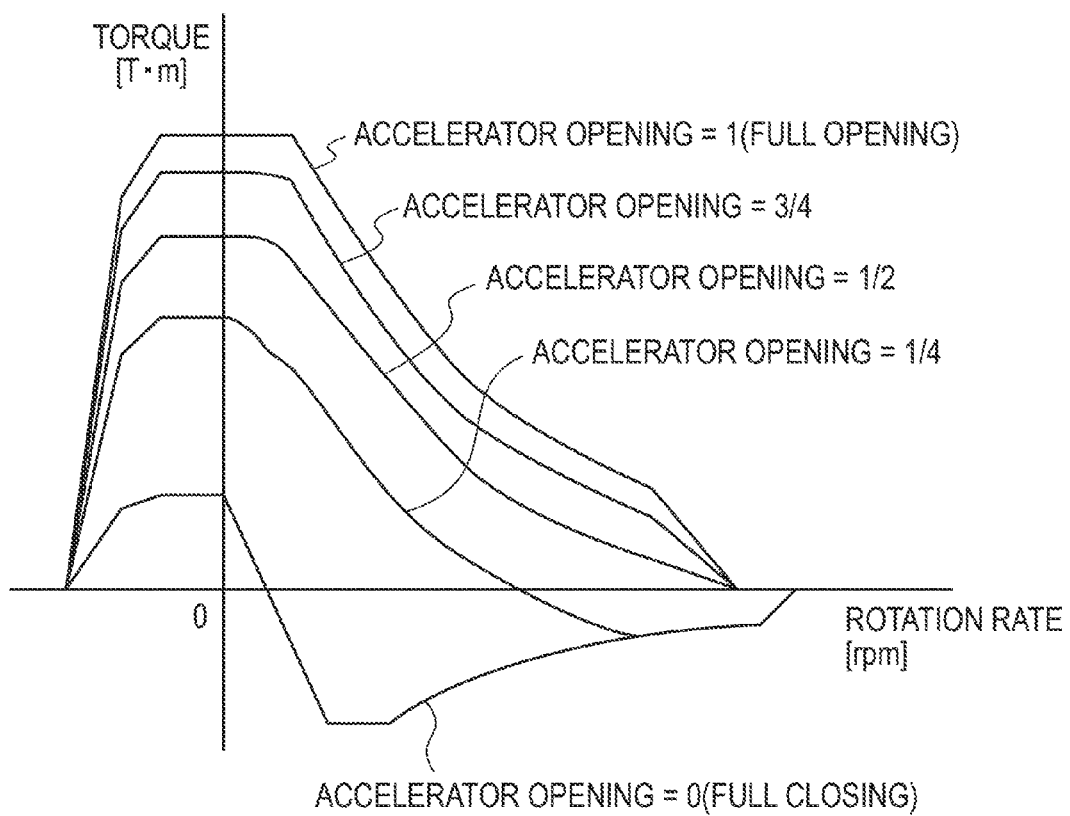
FIG. 3 is a diagram showing an example of an accelerator opening-torque table.

In step S202, a first torque instruction value Tm1* is set. Specifically, based on the accelerator opening θ and the vehicle speed V input in step S201, an accelerator opening-torque table shown in FIG. 3 is referenced, and thus the first torque instruction value Tm1* is set.

In step S203, the first torque instruction value Tm1* set in step S202 and the motor rotation speed ωm are input, and without waste of the response of a drive shaft torque, a final torque instruction value Tm2* for reducing drive force transmission system vibrations (such as torsional vibrations of the drive shaft 8) is set. A method of setting the final torque instruction value Tm2* will be described in detail later.

In step S204, based on the final torque instruction value Tm2* set in step S203, the motor rotation speed ωm and the direct-current voltage value Vdc, a d-shaft current target value id* and a q-shaft current target value iq* are determined.

In step S205, current control is performed so that a d-shaft current id and a q-shaft current iq are respectively made equal to the d-shaft current target value id* and the q-shaft current target value iq* determined in step S204. Hence, first, based on the three-phase alternating-current values iu, iv and iw and the rotor phase α of the electric motor 4 input in step S201, the d-shaft current id and the q-shaft current iq are determined.

Then, d-shaft and q-shaft voltage instruction values vd and vq are calculated from the deviation between d-shaft and q-shaft current instruction values id* and iq* and the d-shaft and q-shaft currents id and iq.

Then, three-phase alternating-current voltage instruction values vu, vv and vw are determined from the d-shaft and q-shaft voltage instruction values vd and vq and the rotor phase α of the electric motor 4. Then, PWM signals tu (%), tv (%) and tw (%) are determined from the determined three-phase alternating-current voltage instruction values vu, vv and vw and the direct-current voltage value Vdc. By the PWM signals tu, tv and tw determined as described above, the switching elements of the inverter 3 are turned on and off, and thus the electric motor 4 can be driven by a desired torque indicated by the torque instruction value.

Figure 4:
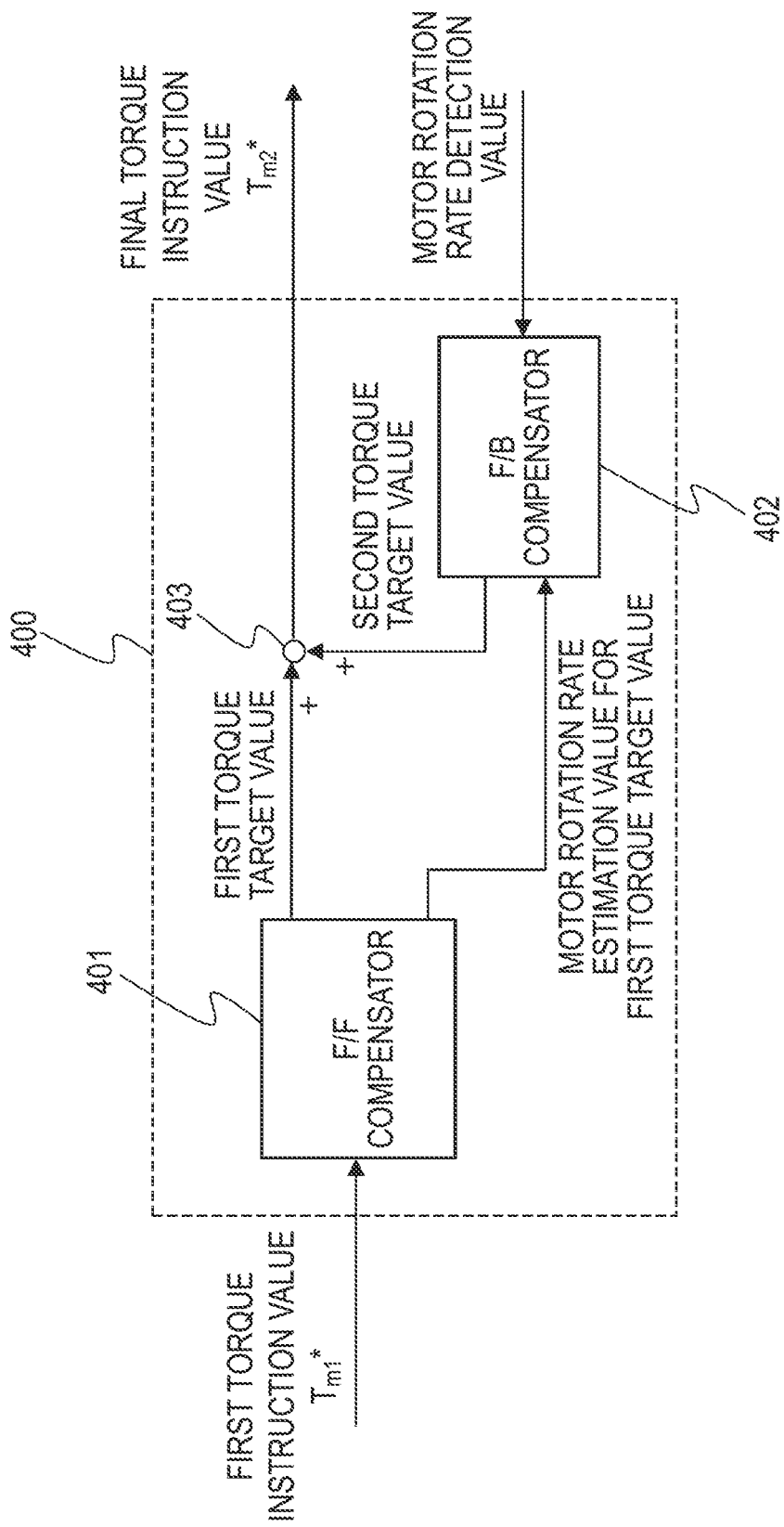
FIG. 4 is an example of a control block diagram for performing processing that sets a final torque instruction value Tm2*.

FIG. 4 is an example of a control block diagram for performing processing that sets a final torque instruction value Tm2*. A vibration suppression control computation unit 400 that sets the final torque instruction value Tm2* includes a feedforward compensator 401 (hereinafter referred to as an "F/F compensator 401"), a feedback compensator 402 (hereinafter referred to as an "F/B compensator 402") and an adder 403.

The F/F compensator 401 inputs the first torque instruction value Tm1*, and outputs a first torque target value and a motor rotation rate estimation value for the first torque target value.

The F/B compensator 402 inputs the motor rotation rate estimation value for the first torque target value and a motor rotation rate detection value, and outputs a second torque target value.

The adder 403 adds the first torque target value output from the F/F compensator 401 and the second torque target value output from the F/B compensator 402, and outputs the final torque instruction value Tm2*.

Figure 5:
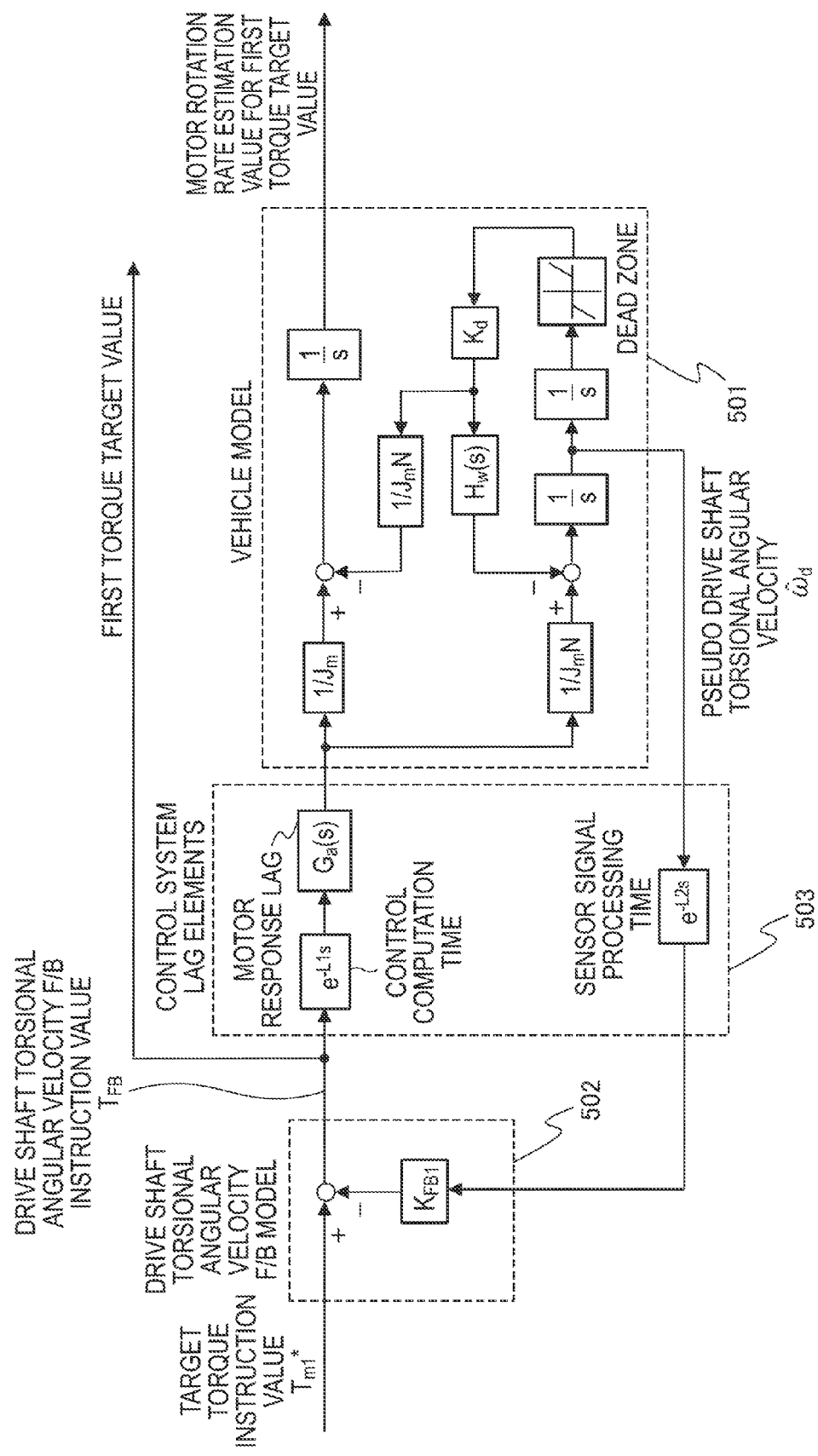
FIG. 5 is a block diagram showing the detailed configuration of an F/F compensator.

FIG. 5 is a block diagram showing the detailed configuration of the F/F compensator 401. The F/F compensator 401 includes: a vehicle model 501 that is formed with vehicle parameters and a dead zone model simulating a gear backlash; a drive shaft torsional angular velocity F/B model 502 that subtracts, from the torque instruction value, a value obtained by multiplying a feedback gain (F/B gain) to a pseudo torsional angular velocity; and control system lag elements 503.

A value with consideration given to a drive shaft torsional angular velocity F/B instruction value $T_{FB}$ that is an output of the drive shaft torsional angular velocity F/B model 502, a control computation time $e^{-L_1 s}$ that is the control system lag elements 503 and a motor response lag Ga(s) is input to the vehicle model 501, and thus a pseudo drive torsional angular velocity $\hat{\omega}d$ is determined. With consideration given to the determined pseudo drive torsional angular velocity $\hat{\omega}d$ and a sensor signal processing time lag $e^{-L_2 s}$ that is the control system lag elements 503, a value by summing an F/B gain $K_{FB1}$ is subtracted from the first torque instruction value Tm1*, a value obtained by the subtraction is set as the drive shaft torsional angular velocity F/B instruction value $T_{FB}$ and this value is assumed to be the first torque target value.

The vehicle model 501 will first be described.

Figure 6:
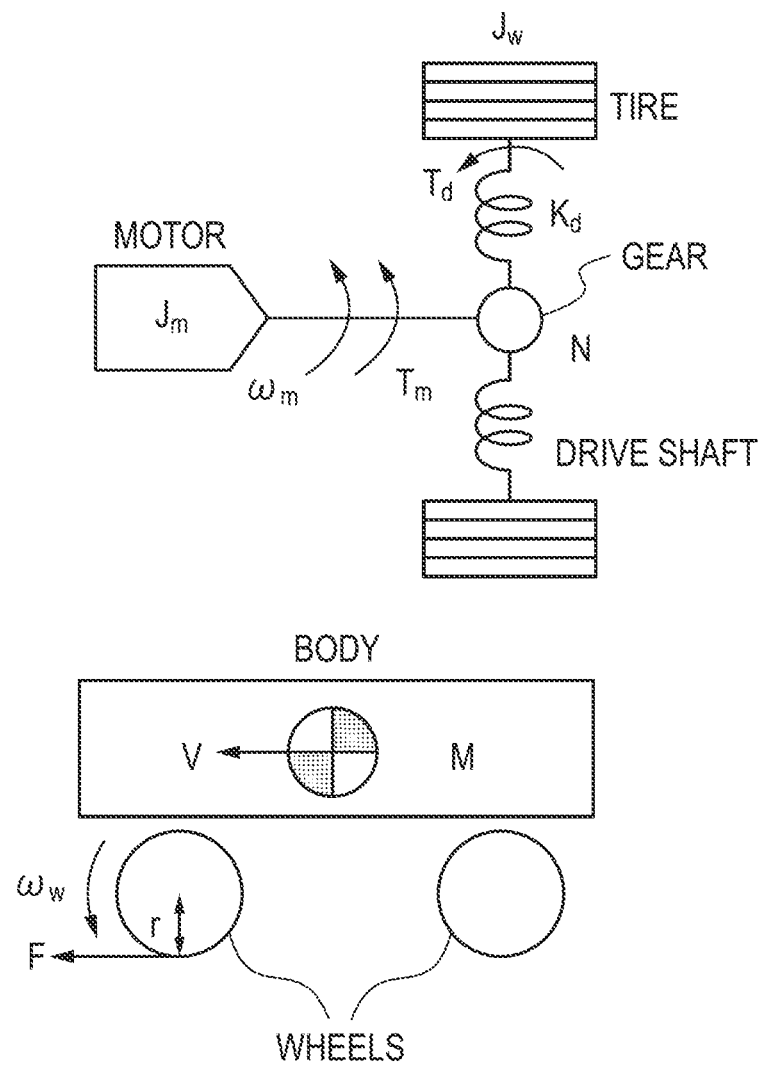
FIG. 6 is a diagram of a modeled drive force transmission system of the vehicle.

FIG. 6 is a diagram of a modeled drive force transmission system of the vehicle, and the motion equation of the vehicle is expressed by formulas (1) to (6).

[Formula 1]
$$J_m \cdot \dot{\omega}_m = T_m - T_d/N \quad (1)$$

[Formula 2]
$$2J_w \cdot \dot{\omega}_w = T_d - rF \quad (2)$$

[Formula 3]
$$M \cdot \dot{V} = F \quad (3)$$

[Formula 4]
$$T_d = K_d \cdot \theta \quad (4)$$

[Formula 5]
$$F = K_t \cdot (r\omega_m - V) \quad (5)$$

[Formula 6]
$$\theta = \int \left( \frac{\omega_m}{N_{al}} - \omega_w \right) dt \quad (6)$$

The parameters in formulas (1) to (6) are as follows.
Jm: motor inertia
Jw: drive wheel inertia (for one shaft)
M: Mass of a vehicle
Kd: torsional stiffness of a drive shaft
Kt: coefficient on friction between a tire and a road surface
N: overall gear ratio
r: tire load radius
ωm: motor angular velocity
ωw: drive wheel angular velocity
Tm: motor torque
Td: drive shaft torque
F: drive force (for two shafts)
V: vehicle speed
θ: torsional angle of the drive shaft When the transmission characteristic from the torque instruction value Tm to the motor angular velocity ωm is determined by performing Laplace transform on formulas (1) to (6), it can be expressed by formulas (7) and (8):

[Formula 7]
$$\omega_m = G_p(s) \cdot T_m \quad (7)$$

[Formula 8]
$$G_p(s) = \frac{1}{s} \cdot \frac{b_3 s^3 + b_2 s^2 + b_1 s + b_0}{a_3 s^3 + a_2 s^2 + a_1 s + a_0} \quad (8)$$

Here, the parameters in formula (8) can be expressed by formulas (9) to (16) below.

[Formula 9]
$$a_3 = 2J_m J_w M \quad (9)$$

[Formula 10]
$$a_2 = K_t J_m (2J_w + r^2 M) \quad (10)$$

[Formula 11]
$$a_1 = K_d M(J_m + 2J_w/N^2) \quad (11)$$

[Formula 12]
$$a_0 = K_d K_t (J_m + 2J_w/N^2 + r^2 M/N^2) \quad (12)$$

[Formula 13]
$$b_3 = 2J_w M \quad (13)$$

[Formula 14]
$$b_2 = K_t(2J_w + r^2 M) \quad (14)$$

[Formula 15]
$$b_1 = K_d M \quad (15)$$

[Formula 16]
$$b_0 = K_d K_t \quad (16)$$

The transmission characteristic from the torque instruction value Tm to a drive shaft torque Td is expressed by formula (17), and parameters c1 and c0 in formula (17) are expressed by formulas (18) and (19), respectively.

[Formula 17]
$$\frac{T_d}{T_m} = \frac{c_1 s + c_0}{a_3 s^3 + a_2 s^2 + a_1 s + a_0} \quad (17)$$

[Formula 18]
$$c_1 = 2K_d J_w M/N \quad (18)$$

[Formula 19]
$$c_0 = K_d K_t (2J_w + r^2 M)/N \quad (19)$$

When the transmission characteristic from the motor angular velocity ωm to the drive wheel angular velocity ωw is determined from formulas (2), (4), (5) and (6), it can be expressed by formula (20) below.

[Formula 20]
$$\frac{\omega_m}{\omega_m} = \frac{b_1 s + b_0}{b_3 s^3 + b_2 s^2 + b_1 s + b_0} \cdot \frac{1}{N} \quad (20)$$

From formulas (7), (8) and (20), the transmission characteristic from the torque instruction value Tm to the drive wheel angular velocity ωw is expressed by formula (21) below.

[Formula 21]
$$\frac{\omega_m}{T_m} = \frac{1}{N} \cdot \frac{1}{s} \cdot \frac{b_1 s + b_0}{a_3 s^3 + a_2 s^2 + a_1 s + a_0} \quad (21)$$

From formulas (17) and (21), the transmission characteristic from the drive shaft torque Td to the drive shaft angular velocity ωw is expressed by formula (22) below.

[Formula 22]
$$\omega_w = \frac{1}{N} \cdot \frac{1}{s} \cdot \frac{b_1 s + b_0}{c_1 s + c_0} T_d \quad (22)$$

Here, when formula (1) is transformed, it is expressed by formula (23) below.

[Formula 23]

$$\frac{\omega_m}{N} = \frac{1}{J_m N s} T_m - \frac{1}{J_m N^2 s} T_d \quad (23)$$

Hence, from formulas (22) and (23), a drive shaft torsional angular velocity $\omega m/N - \omega w$ can be expressed by formula (24) below:

[Formula 24]

$$\frac{\omega_m}{N} - \omega_w = \frac{1}{J_m N s} T_m - \frac{1}{J_m N^2 s} T_d - \frac{1}{N} \cdot \frac{1}{s} \cdot \frac{b_1 s + b_0}{c_1 s + c_0} T_d \quad (24)$$
$$= \frac{1}{s} \cdot \left( \frac{T_m}{J_m N} - H_w(s) \cdot T_d \right)$$

Here, Hw(s) in formula (24) can be expressed by formulas (25) to (29).

[Formula 25]

$$H_w(s) = \frac{v_1 s + v_0}{w_1 s + w_0} \quad (25)$$

[Formula 26]

$$v_1 = J_m N b_1 + c_1 = 2 J_w M N (J_m + K_d / N^2) \quad (26)$$

[Formula 27]

$$v_0 = J_m N b_0 + c_0 = K_d K_t (2 J_m N^2 + 2 J_w + r^2 M)/N \quad (27)$$

[Formula 28]

$$w_1 = J_m N^2 c_1 = 2 K_d J_m J_w M N \quad (28)$$

[Formula 29]

$$w_0 = J_m N^2 c_0 = K_d K_t J_m (2 J_w + r^2 M) N \quad (29)$$

When a backlash characteristic from the motor to the drive shaft is modeled by the dead zone, the drive shaft torque Td can be expressed by formula (30) below:

[Formula 30]

$$T_d = \begin{cases} K_d(\theta - \theta_d/2) & (\theta \geq \theta_d/2) \\ 0 & (-\theta_d/2 < \theta < \theta_d/2) \\ K_d(\theta + \theta_d/2) & (\theta \leq -\theta_d/2) \end{cases} \quad (30)$$

where $\theta_d$ is an overall backlash amount from the motor to the drive shaft.

The configuration of the vehicle model 501 shown in FIG. 5 is based on the above description.

The drive shaft torsional angular velocity F/B model 502 will then be described.

With the pseudo torsional angular velocity $\omega d\hat{} = \omega m/N - \omega w$ calculated from the vehicle model 501, the drive shaft torsional angular velocity F/B instruction value $T_{FB}$ is expressed by formula (31) below.

[Formula 31]

$$T_{FB} = K_{FB1} \cdot (\omega_m / N - \omega_w) \quad (31)$$

Formula (31) can be expressed by formula (32) from formulas (4) and (6).

[Formula 32]

$$T_{FB} = \frac{K_{FB1} s}{K_d} \cdot T_d \quad (32)$$

Formula (17) can be transformed into formula (33):

[Formula 33]

$$\frac{T_d}{T_m} = \frac{c_1 s + c_0}{a_3 s^3 + a_2 s^2 + a_1 s + a_0} = \frac{c_1}{a_3} \cdot \frac{s + c_0/c_1}{(s + \alpha)(s^2 + 2\zeta_p \omega_p s + \omega_p^2)} \quad (33)$$

where $\xi p$ is an attenuation coefficient in a drive torque transmission system, and $\omega_p$ is a natural resonance frequency in the drive torque transmission system.

Furthermore, when the extreme and the zero point in formula (33) are checked, since $\alpha = c_0/c_1$, pole-zero cancellation is performed to obtain formula (34) below.

[Formula 34]

$$T_d = \frac{g_t}{s^2 + 2\zeta_p \omega_p s + \omega_p^2} T_m \quad (34)$$
$$g_t = c_0/(a_3 \cdot \alpha)$$

When the drive shaft torsional angular velocity F/B instruction value $T_{FB}$ is subtracted from the torque instruction value $T_m$ by formulas (32) and (34), the drive shaft torque Td can be expressed by formula (35) below.

[Formula 35]

$$T_d = \frac{g_t}{s^2 + 2\zeta_p \omega_p s + \omega_p^2} (T_m - T_{FB}) \quad (35)$$
$$= \frac{g_t}{s^2 + 2\zeta_p \omega_p s + \omega_p^2} \left( T_m - \frac{K_{FB1} s}{K_d} \cdot T_d \right)$$

When formula (35) is transformed, the transmission characteristic of the drive shaft torsional angular velocity F/B system can be expressed by formula (36) below.

[Formula 36]

$$T_d = \frac{g_t}{s^2 + (2\zeta_p \omega_p + g_t K_{FB1}/K_d) s + \omega_p^2} T_m \quad (36)$$

Here, a model response is expressed by formula (37) below.

[Formula 37]

$$T_d = \frac{g_t}{s^2 + 2\omega_p s + \omega_p^2} T_m \quad (37)$$

Conditions under which the transmission characteristic of the drive shaft torsional angular velocity F/B system agrees with the model response are expressed by formula (38) below.

[Formula 38]

$$2\xi_p\omega_p + g_t K_{FB1}/K_d = 2\omega_p \tag{38}$$

From formula (38), the F/B gain $K_{FB1}$ can be expressed by formula (39) below.

[Formula 39]

$$K_{FB1} = 2(1-\xi_p)\omega_p K_d/g_t \tag{39}$$

In the control system lag elements 503, consideration is given to the control computation time lag $e^{-L1s}$, the motor response lag Ga(s) and the sensor signal processing time lag $e^{-L2s}$. Here, L1 and L2 are the control computation time and the sensor signal processing time, respectively. More specifically, the control computation time corresponds to a time necessary for a torsional vibration control computation performed in the present embodiment, that is, a time lag corresponding to a time necessary for calculating the final torque target value after the input of the motor torque instruction value, and the sensor signal processing time corresponds to a time necessary for detecting a signal with various types of sensors such as a rotation speed sensor 6 or a time lag corresponding to a time necessary for processing the detected signal value.

The motor response lag Ga(s) is expressed by formula (40) below. The motor response lag is a time until a motor torque is actually generated for the final torque target value. Here, τa is a motor response time constant.

[Formula 40]

$$G_a(s) = \frac{1}{\tau_a s + 1} \tag{40}$$

The configuration of the F/B compensator 402 will then be described.

Figure 7:
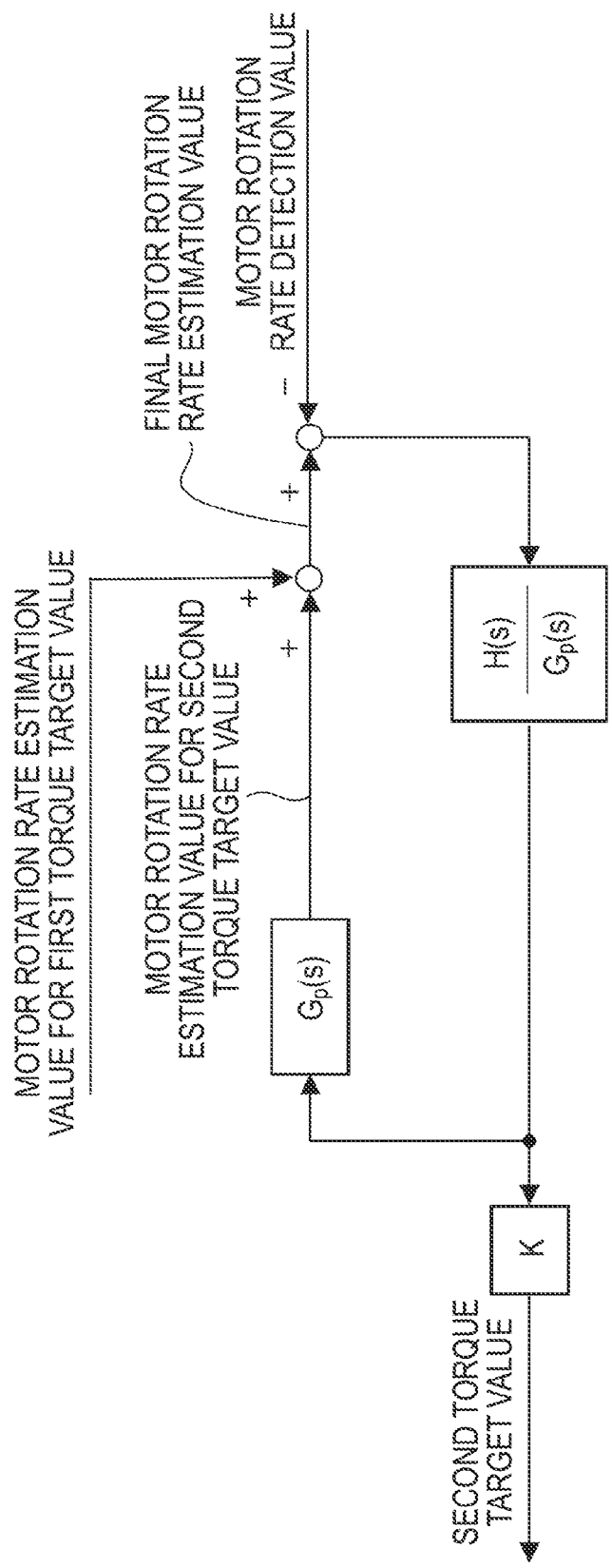
FIG. 7 is a block diagram showing the detailed configuration of an F/B compensator.

FIG. 7 is a block diagram showing the detailed configuration of the F/B compensator 402. The F/B compensator 402 adds a motor rotation rate estimation value for the second torque target value calculated by inputting the second torque target value and using the transmission characteristic Gp(s) which is a control target and a motor rotation rate estimation value for the first torque target value calculated by the vehicle model of the F/F compensator 401, and thereby determines a final motor rotation rate estimation value. Then, a deviation between the determined final motor rotation rate estimation value and the motor rotation rate detection value is passed through a filter H(s)/Gp(s) formed with the inverse characteristic of the transmission characteristic Gp(s) which is a control target and a bandpass filter H(s), and the second torque target value is calculated. In the bandpass filter H(s), a center frequency agrees with the drive system torsional resonance frequency of the vehicle. The gain K is arranged in order to adjust a stability margin (a gain margin, a phase margin) in an F/B system control system, and is a value equal to or less than 1.

Although in the configuration of the device for controlling the vehicle, the F/B compensator 402 is preferably provided, motor torque control can be performed based on the first torque target value output from the F/F compensator 401 without provision of the F/B compensator 402.

As described above, in the device for controlling the vehicle according to the first embodiment, the F/F compensator 401 that inputs the motor torque instruction value and that computes the first torque target value by feedforward computation and the electric motor controller 2 (motor torque control unit) that controls the motor torque according to the first torque target value are provided. The F/F compensator 401 includes: the vehicle model 501 that inputs the motor torque instruction value to model the characteristic from the motor torque to the drive shaft torsional angular velocity; and the drive shaft torsional angular velocity feedback model 502 that feeds back the drive shaft torsional angular velocity output from the vehicle model 501 to the motor torque instruction value and that thereby computes the first torque target value. In this way, since it is not necessary to set the gain of the drive shaft torsional angular velocity feedback model 502 low with consideration given to safety, it can be set at a feedback gain that satisfies vibration suppression performance. When there is no lag or disturbance in the control system, with the first torque target value, which is a feedforward compensation value, it is possible to reduce drive shaft torsional vibrations.

The drive force transmission system of the vehicle model has a dead zone where the motor torque is not transmitted to the drive shaft torque of the vehicle, can simulate the gear backlash characteristic and can reduce drive shaft torsional angular vibrations even when the gear backlash is generated.

Since the width of the dead zone in the drive force transmission system of the vehicle model is set at the total of the amounts of gear backlash from the motor to the drive shaft, the backlash characteristic can be realized without the amounts of backlash of a plurality of gears being set individually.

Since the F/F compensator 401 performs, on the motor torque instruction value, lag processing corresponding to the lag elements included in the control system, and then performs the feedforward computation, it is possible to perform appropriate control with consideration given to the lag elements included in the control system. Since the lag elements included in the control system include at least one of a time lag caused by detecting the motor rotation rate which is a vehicle state amount and performing predetermined processing, a time lag necessary for calculating the final torque target value after the input of the motor torque instruction value and a time lag until the motor torque is actually produced for the final torque target value, it is possible to perform more appropriate control by performing the lag processing based on the lag elements actually produced.

The vehicle model is obtained by inputting a target torque instruction value and modeling a characteristic from the motor torque to the drive shaft torsional angular velocity and a characteristic from the motor torque to the motor rotation rate, and the F/B compensator 402 performs feedback computation based on the motor rotation rate estimation value and the motor rotation rate detection value output from the vehicle model 501, and thereby computes the second torque target value. The electric motor controller 2 controls the motor torque according to the final torque target value obtained by adding the first torque target value output from the F/F compensator 401 and the second torque target value output from the F/B compensator 402. In this way, even if a disturbance or a model error is produced, it is possible to reduce drive shaft torsional vibrations.

—Second Embodiment—

Figure 8:
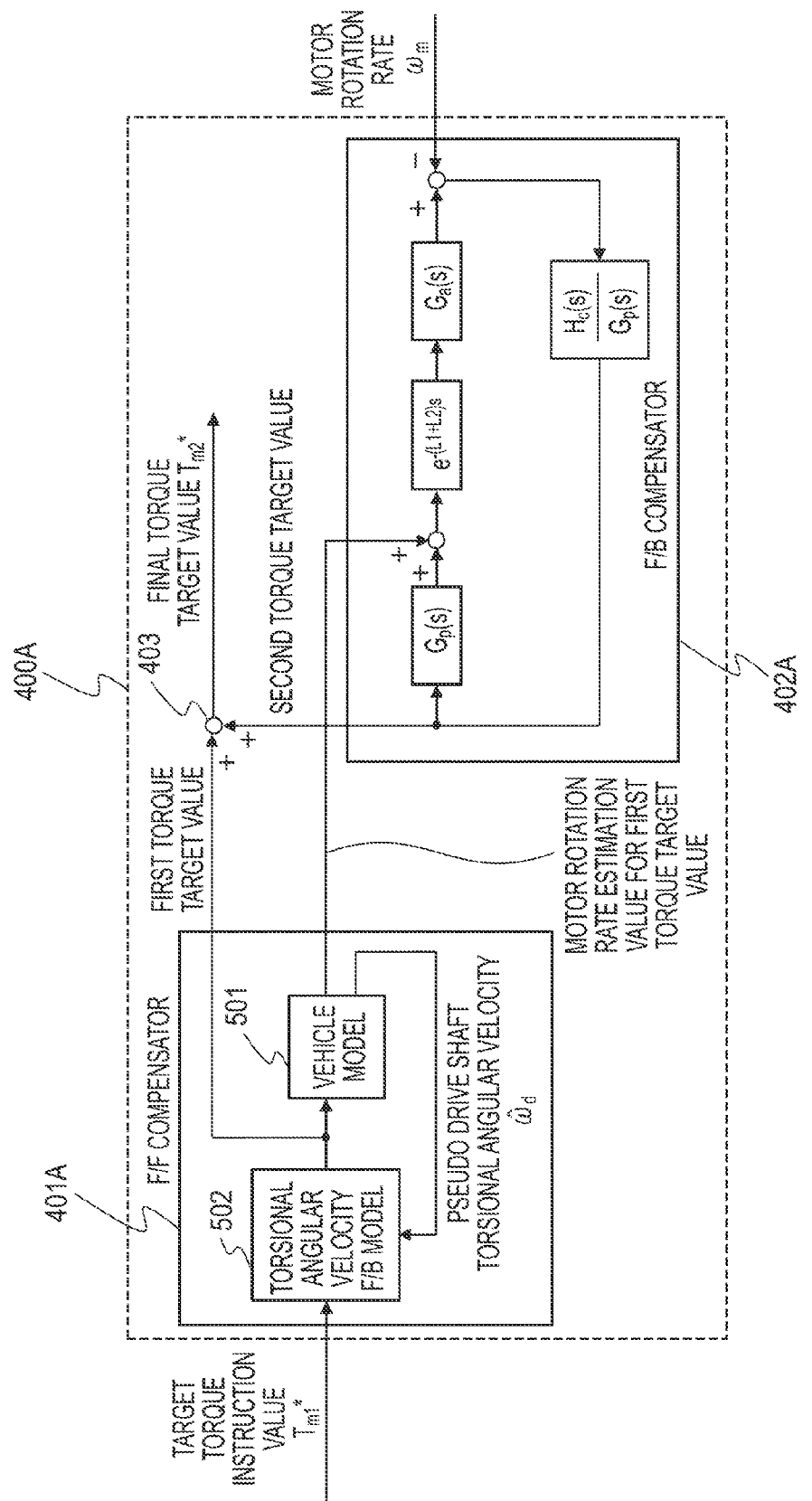
FIG. 8 is an example of a control block diagram for performing, in a second embodiment, processing that sets the final torque instruction value Tm2*.

FIG. 8 is an example of a control block diagram for performing, in a second embodiment, processing that sets the final torque instruction value Tm2*. A vibration suppression control computation unit 400A that sets the final torque instruction value Tm2* includes an F/F compensator 401A, an F/B compensator 402A and the adder 403.

The F/F compensator 401A has a configuration that is obtained by omitting the control system lag elements 503 from the configuration of the F/F compensator 401 shown in FIG. 5. Specifically, the F/F compensator 401A includes: the vehicle model 501 that is formed with vehicle parameters and a dead zone model simulating a gear backlash; and the drive shaft torsional angular velocity F/B model 502 that subtracts, from the torque instruction value, a value obtained by multiplying the pseudo torsional angular velocity by the F/B gain, and sets the output of the drive shaft torsional angular velocity F/B model 502 at the first torque target value.

The F/B compensator 402A is obtained by adding a control block consisting of the control computation time lag $e^{-L1s}$, the sensor signal processing time lag $e^{-L2s}$ and the motor response lag Ga(s) constituting control system lag elements to the configuration of the F/B compensator 402 shown in FIG. 7. Hence, the F/B compensator 402A adds the motor rotation rate estimation value for the second torque target value calculated by inputting the second torque target value and using the transmission characteristic Gp(s) which is a control target and the motor rotation rate estimation value for the first torque target value calculated from the vehicle model 501 of the F/F compensator 401A, and thereby calculates the final motor rotation rate estimation value. A deviation between the final motor rotation rate estimation value obtained by passing the calculated final motor rotation rate estimation value through each of the control block consisting of the control computation time lag $e^{-L1s}$, the sensor signal processing time lag $e^{-L2s}$ and the motor response lag Ga(s) and the motor rotation rate detection value is passed through the filter Hc(s)/Gp(s) formed with the inverse characteristic of the transmission characteristic Gp(s) which is a control target and the bandpass filter Hc(s), and the second torque target value is calculated. In this way, the effects of the control system lag elements are added to the motor rotation rate estimation value for the first torque target value and the motor rotation rate estimation value for the second torque target value. The center frequency and the gain of the bandpass filter H(s) are adjusted, and thus Hc(s) is set, with the result that it is possible to remove the displacement of the phase of the feedback torque.

As described above, in the device for controlling the electric vehicle according to the second embodiment, the F/B compensator 402A performs, on the motor rotation rate estimation value, the lag processing corresponding to the lag elements included in the control system, performs the feedback computation based on the motor rotation rate estimation value and the motor rotation rate detection value on which the lag processing has been performed and thereby computes the second torque target value, with the result that it is possible to perform appropriate feedback control with consideration given to the lag elements included in the control system.

—Third Embodiment—

Figure 9:
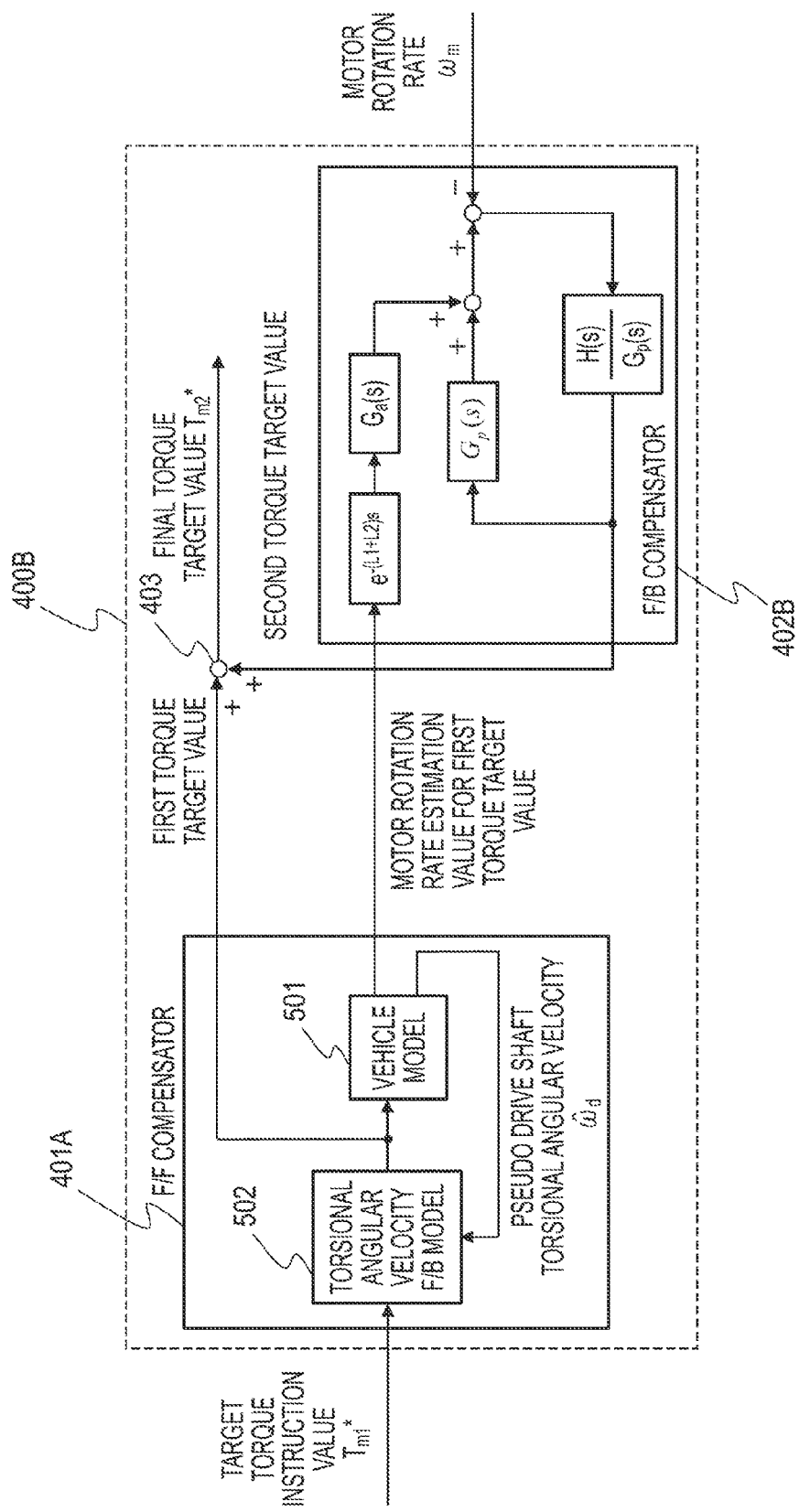
FIG. 9 is an example of a control block diagram for performing, in a third embodiment, processing that sets the final torque instruction value Tm2*.

FIG. 9 is an example of a control block diagram for performing, in a third embodiment, processing that sets the final torque instruction value Tm2*. A vibration suppression control computation unit 400B that sets the final torque instruction value Tm2* includes the F/F compensator 401A, an F/B compensator 402B and the adder 403.

The configuration of the F/F compensator 401A is the same as that of the F/F compensator 401A shown in FIG. 8. Specifically, the F/F compensator 401A includes: the vehicle model 501 that is formed with vehicle parameters and a dead zone model simulating a gear backlash; and the drive shaft torsional angular velocity F/B model 502 that subtracts, from the torque instruction value, a value obtained by multiplying the pseudo torsional angular velocity by the F/B gain, and sets the output of the drive shaft torsional angular velocity F/B model 502 at the first torque target value.

The F/B compensator 402B adds a value obtained by passing the motor rotation rate estimation value for the first torque target value calculated by the vehicle model 501 of the F/F compensator 401A through each of the control block consisting of the control computation time lag $e^{-L1s}$, the sensor signal processing time lag $e^{-L2s}$ and the motor response lag Ga(s) and the motor rotation rate estimation value for the second torque target value calculated by inputting the second torque target value and using the transmission characteristic Gp(s) which is a control target, and thereby calculates the final motor rotation rate estimation value. A deviation between the final motor rotation rate estimation value calculated and the motor rotation rate detection value is passed through the filter H(s)/Gp(s) formed with the inverse characteristic of the transmission characteristic Gp(s) which is a control target and the bandpass filter H(s), and the second torque target value is calculated.

As described above, in the device for controlling the electric vehicle according to the third embodiment, the F/B compensator 402B performs, on the motor rotation rate estimation value, the lag processing corresponding to the lag elements included in the control system, performs the feedback computation based on the motor rotation rate estimation value on which the lag processing has been performed and the motor rotation rate detection value, and thereby computes the second torque target value, with the result that it is possible to perform appropriate feedback control with consideration given to the lag elements included in the control system.

—Fourth Embodiment—

Figure 10:
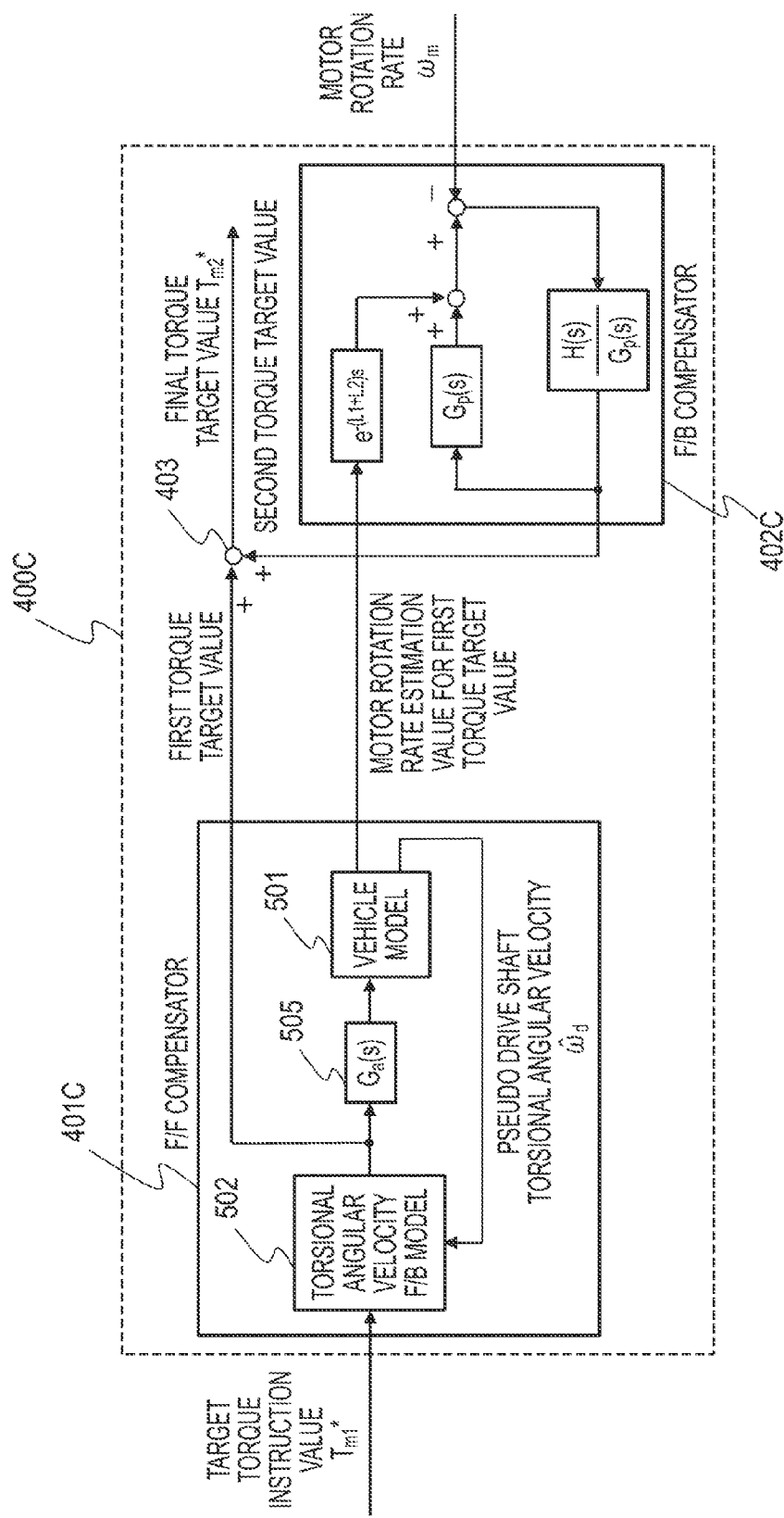
FIG. 10 is an example of a control block diagram for performing, in a fourth embodiment, processing that sets the final torque instruction value Tm2*.

FIG. 10 is an example of a control block diagram for performing, in a fourth embodiment, processing that sets the final torque instruction value Tm2*. A vibration suppression control computation unit 400C that sets the final torque instruction value Tm2* includes an F/F compensator 401C, an F/B compensator 402C and the adder 403.

The F/F compensator 401C is obtained by adding a control block 505 having the transmission characteristic of the motor response lag Ga(s) to the configuration of the F/F compensator 401A shown in FIG. 9. Specifically, the F/F compensator 401C includes: the vehicle model 501 that is formed with vehicle parameters and a dead zone model simulating a gear backlash; the drive shaft torsional angular velocity F/B model 502 that subtracts, from the torque instruction value, a value obtained by multiplying the pseudo torsional angular velocity by the F/B gain; and the control block 505 having the transmission characteristic of the motor response lag Ga(s) which is the lag element included in the control system, and sets the output of the drive shaft torsional angular velocity F/B model 502 at the first torque target value. The control block 505 is provided between the torsional angular velocity F/B model 502 and the vehicle model 501.

The F/B compensator 402C adds a value obtained by passing the motor rotation rate estimation value for the first torque target value calculated by the vehicle model 501 of the F/F compensator 401C through each of the control block consisting of the control computation time lag $e^{-L1s}$ and the sensor signal processing time lag $e^{-L2s}$ and the motor rotation rate estimation value for the second torque target value calculated by inputting the second torque target value and using the transmission characteristic Gp(s) which is a control target, and thereby calculates the final motor rotation rate estimation value. A deviation between the final motor rotation rate estimation value and the motor rotation rate detection value calculated is passed through the filter H(s)/Gp(s) formed with the inverse characteristic of the transmission characteristic Gp(s) which is a control target and the bandpass filter H(s), and the second torque target value is calculated. In this way, it is possible to add the effects of the torque response lag to the first torque target value and to add the effects of the control computation time and sensor signal processing time to the motor rotation rate estimation value for the first torque target value.

As described above, in the device for controlling the electric vehicle according to the fourth embodiment, the F/B compensator 402C performs, on the motor rotation rate estimation value, the lag processing corresponding to the lag elements included in the control system, performs the feedback computation based on the motor rotation rate estimation value and the motor rotation rate detection value on which the lag processing has been performed and thereby computes the second torque target value, with the result that it is possible to perform appropriate feedback control with consideration given to the lag elements included in the control system.

Figure 11:
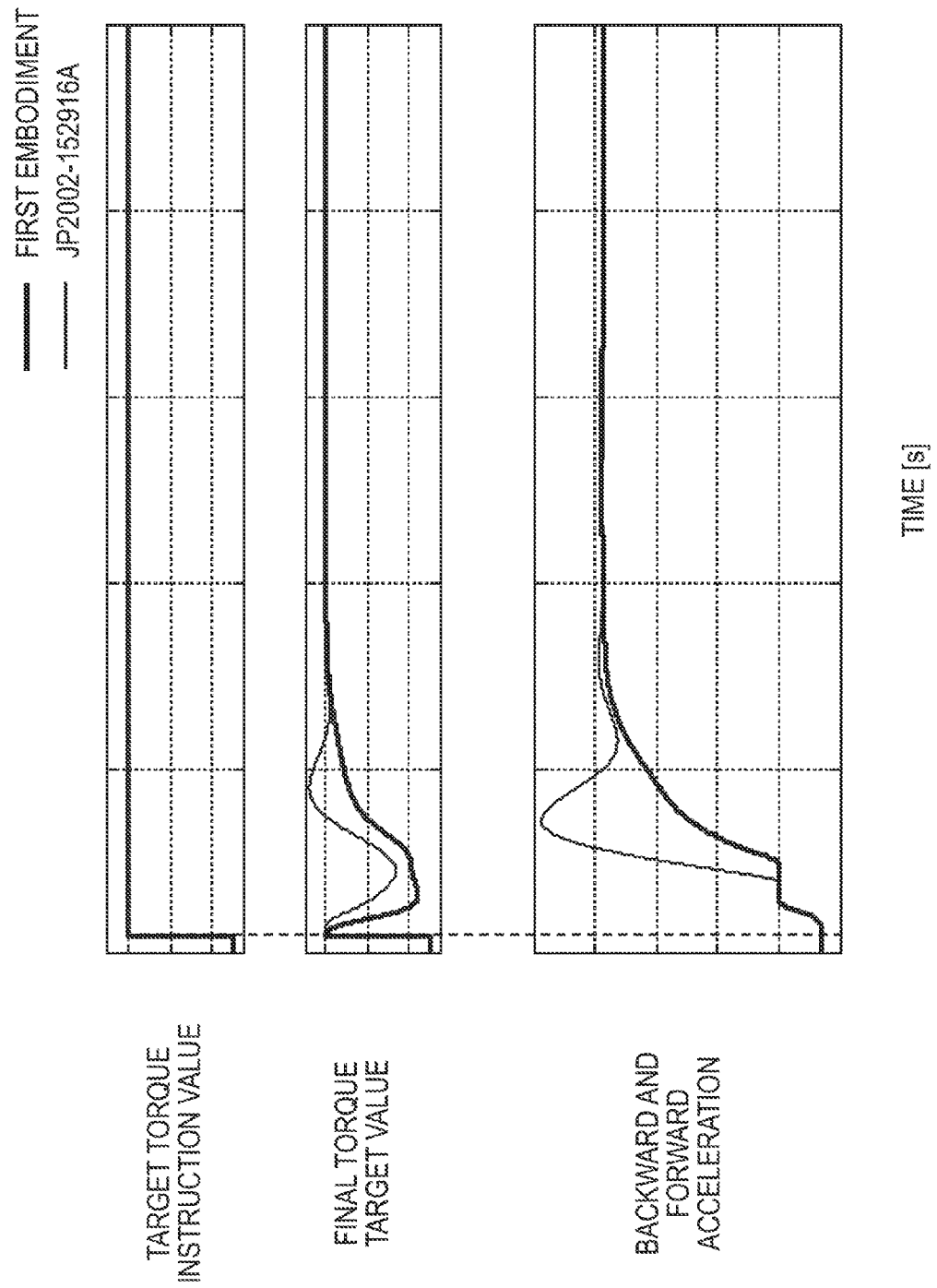
FIG. 11 is a comparison diagram of the results of the control of the device for controlling the electric vehicle according to the first embodiment and a control device disclosed in JP2002-152916A.

FIG. 11 is a comparison diagram of the results of the control of the device for controlling the electric vehicle according to the first embodiment and a control device disclosed in JP2002-152916A. The figure shows, sequentially from above, variations in the target torque instruction value with time, variations in the final torque target value with time and variations in backward and forward acceleration with time.

When in the control device disclosed in JP2002-152916A, with consideration given to the lag times present in the feedback control system such as the control computation time lag, the sensor signal processing time lag and the motor response lag, in order to reliably prevent the divergence of the feedback control system, the feedback gain is set low so as to acquire an appropriate stability margin (a gain margin, a phase margin), as shown in FIG. 11, an overshoot of the backward and forward acceleration occurs.

On the other hand, in the device for controlling the electric vehicle according to the first embodiment, even when the gain K of the F/B compensator 402 is set so as to acquire the same stability margin, since it is possible to prevent almost all of torsional vibrations by the feedforward compensation, it is possible to obtain a smooth response without the shock shown in FIG. 11. Likewise, in the device for controlling the electric vehicle according to the second to fourth embodiments, even when the gain of the F/B compensator 402 is added so as to acquire the stability margin, it is possible to obtain a smooth response without the shock shown in FIG. 11.

The present invention is not limited to the embodiments described above.

This application claims priority based on Japanese Patent Application 2012-094722, filed on Apr. 18, 2012 with Japan Patent Office, the entire contents of which are hereby incorporated by reference.

The invention claimed is:

1. A device for controlling an electric vehicle that is configured to set a motor torque instruction value based on vehicle information and control a torque of a motor connected to a drive wheel, the device comprising:
a feedforward computation unit that is configured to input the motor torque instruction value without inputting a detection value of a sensor provided in the electric vehicle and compute a first torque target value by feedforward computation; and
a motor torque control unit that is configured to control the motor torque according to the first torque target value,
wherein the feedforward computation unit includes: a vehicle model which is configured to input the motor torque instruction value to model a characteristic from the motor torque to a drive shaft torsional angular velocity; and a drive shaft torsional angular velocity feedback model which is configured to feed back the drive shaft torsional angular velocity output from the vehicle model to the motor torque instruction value to compute the first torque target value.

2. The device for controlling an electric vehicle according to claim 1,
wherein a drive force transmission system in the vehicle model includes a dead zone in which the motor torque is not transmitted to a drive shaft torque of the vehicle.

3. The device for controlling an electric vehicle according to claim 2,
wherein a width of the dead zone of the drive force transmission system in the vehicle model is a total of amounts of gear backlash from the motor to a drive shaft.

4. The device for controlling an electric vehicle according to claim 1,
wherein the feedforward computation unit is configured to perform, on the motor torque instruction value, lag processing corresponding to a lag element included in a control system, and thereafter perform the feedforward computation.

5. The device for controlling an electric vehicle according to claim 4.
wherein the lag element included in the control system includes at least one of a time lag caused by detecting a vehicle state amount indicating a state of the vehicle and performing predetermined processing, a time lag necessary for calculating a torque target value for controlling the motor after the input of the motor torque instruction value and a time lag until the motor torque is actually produced for the torque target value for controlling the motor.

6. The device for controlling an electric vehicle according to claim 1,
wherein the vehicle model is configured to model the characteristic from the motor torque to the drive shaft torsional angular velocity and a characteristic from the motor torque to a motor rotation rate,
the device further includes:
a motor rotation rate detection unit that is configured to detect the motor rotation rate; and
a feedback computation unit that is configured to perform feedback computation based on a motor rotation rate estimation value output from the vehicle model and the motor rotation rate detection value so as to compute a second torque target value and
the motor torque control unit is configured to control the motor torque according to a final torque target value obtained by adding the first torque target value and the second torque target value.

7. The device for controlling an electric vehicle according to claim 6,
wherein the feedback computation unit is configured to perform, on the motor rotation rate estimation value, the lag processing corresponding to the lag element included in the control system, and perform the feedback computation based on the motor rotation rate estimation value on which the lag processing has been performed and the motor rotation rate detection value so as to compute the second torque target value.

8. The device for controlling an electric vehicle according to claim 7,
   wherein the lag element included in the control system includes at least one of a time lag caused by detecting, with the motor rotation rate detection unit, the motor rotation rate and performing predetermined processing, a time lag necessary for calculating the final torque target value after the input of the motor torque instruction value and a time lag until the motor torque is actually produced for the final torque target value.

9. A method of controlling an electric vehicle that is configured to set a motor torque instruction value based on vehicle information and control a torque of a motor connected to a drive wheel, the method comprising:
   a step of inputting the motor torque instruction value without inputting a detection value of a sensor provided in the electric vehicle and computing a first torque target value by feedforward computation; and
   a step of controlling the motor torque according to the first torque target value,
   wherein in the step of computing the first torque target value, a drive shaft torsional angular velocity is determined based on the motor torque instruction value, and the determined drive shaft torsional angular velocity is fed back to the motor torque instruction value such that first torque target value is computed.

* * * * *